(12) United States Patent
Hattori et al.

(10) Patent No.: US 6,266,521 B1
(45) Date of Patent: Jul. 24, 2001

(54) RECEIVER AND METHOD FOR DEMODULATING RECEPTION SIGNALS

(75) Inventors: Tadayuki Hattori; Kazuhiko Seki, both of Tokyo (JP)

(73) Assignee: Uniden Corporation, Tokyo (JP)

( * ) Notice: Subject to any disclaimer, the term of this patent is extended or adjusted under 35 U.S.C. 154(b) by 0 days.

(21) Appl. No.: 09/128,468

(22) Filed: Aug. 4, 1998

(30) Foreign Application Priority Data

Sep. 2, 1997 (JP) .................................................. 9-236388

(51) Int. Cl.$^7$ ....................................................... H04B 1/10
(52) U.S. Cl. ........................ 455/312; 455/307; 455/337; 375/340; 375/350
(58) Field of Search ........................ 455/334, 337, 455/338, 336, 307, 308, 309, 312; 375/324, 340, 325, 326, 350

(56) References Cited

U.S. PATENT DOCUMENTS

| 5,087,975 | * | 2/1992 | Citta et al. .............................. 455/295 |
| 5,661,433 | * | 8/1997 | LaRosa et al. ......................... 329/341 |
| 5,729,576 | * | 3/1998 | Stone et al. ............................ 455/312 |
| 5,808,510 | * | 9/1998 | Gerrits et al. .......................... 329/343 |
| 5,818,881 | * | 10/1998 | Guiffant et al. ....................... 375/334 |
| 5,852,477 | * | 12/1998 | Limberg ................................. 375/350 |
| 5,862,467 | * | 1/1999 | Miyashita .............................. 455/312 |
| 5,910,752 | * | 6/1999 | Filipovic et al. ...................... 329/341 |
| 5,915,028 | * | 6/1999 | Chahabaki .............................. 381/15 |
| 6,002,723 | * | 12/1999 | Chethik ................................. 375/317 |
| 6,118,831 | * | 9/2000 | Masumoto et al. ................... 375/340 |

FOREIGN PATENT DOCUMENTS

| 2-121551 | 5/1990 | (JP) . |
| 2-137551 | 5/1990 | (JP) . |
| 6-164663 | 6/1994 | (JP) . |

* cited by examiner

*Primary Examiner*—Edward F. Urban
(74) *Attorney, Agent, or Firm*—McDermott, Will & Emery

(57) ABSTRACT

A receiver is provided, whereby bit error rate can be improved, while achieving savings in power consumption. The receiver comprises: a quadrature detector 12 for converting an intermediate frequency signal obtained on the basis of a reception signal to a base band signal; a comparator 16 for converting the base band signal to binary form after it has passed through a first LPF 14, which is an analogue filter; a second LPF (CIC filter) 18 for transmitting frequency components of the approximate square wave output by comparator 16 which are odd factors of the fundamental frequency of the signal; and a sampler 20 and comparator 24 which decode the output signal from the second LPF 18 in accordance with a clock reproduced by a clock reproducing circuit 22 on the basis of this output signal.

18 Claims, 4 Drawing Sheets

RECEIVER AND METHOD FOR DEMODULATING RECEPTION SIGNALS

BACKGROUND OF THE INVENTION

1. Field of the Invention

The present invention relates to a receiver for radio communications and to a method for demodulating reception signals, and more particularly, to a receiver suitable for a radio communications system wherein the transmission speed and modulation method are variable.

2. Description of the Related Art

Of currently used radio telephone methods and radio paging systems, there are known systems wherein the transmission speed and modulation method can be varied. For example, in the FLEX (registered trademark) system, which is a radio paging system, there are three transmission speeds (1600/3200/6400 bps) and two modulation methods (2FSK (Frequency Shift Keying)/ 4FSK), and two symbol rates are set (1600/3200 sps). In a radio paging system of this kind, in order to minimize noise bandwidth, desirably, the pass bandwidth of an LPF (Low Pass Filter) located in the signal path after quadrature detection is changed in accordance with the symbol rate.

However, in conventional receivers, if the aforementioned LPF is formed by an analogue circuit, for example, then the LPF is designed to be compatible with a symbol rate of 3200 sps. Therefore, if the symbol rate is 1600 sps, problems arise, such as increased susceptibility to noise and deterioration of the bit error rate (BER).

In order to resolve problems of this kind, the output signal from the aforementioned LPF is converted to binary form, and BER degradation is reduced by passing the signal again through a moving average-type digital LPF which changes bandwidth according to the symbol rate.

However, the moving average-type filter comprises numerous stages of shift registers. Therefore, the circuit becomes relatively large in size, and power consumption also increases. In particular, in radio telephones and pagers of recent years, it has been sought to reduce power consumption and to increase call time and standby time, but if a moving average-type filter is used as described above, then it is difficult to achieve increases in call time and standby time, due to the scale of the circuit involved.

SUMMARY OF THE INVENTION

With a view to resolving the foregoing problems, it is an object of the present invention to provide a receiver, whereby the bit error rate can be reduced by means of a simple circuit composition, whilst reducing power consumption.

The object of the present invention is achieved by means of a receiver comprising: a detector circuit which receives an intermediate frequency signal and converts it to a base band signal; a binary converting circuit which is connected to said detector circuit and converts said base band signal to binary form; a filter circuit which receives output signal from said binary converting circuit and passes frequency components of said output signal, which are odd factors of the fundamental frequency of said output signal; and a decoding circuit which is connected to said filter circuit and decodes output signal in accordance with a clock recovered from the output signal from said filter circuit.

According to the present invention, a signal converted to binary form by the binary converting circuit and having an approximately square waveform is filtered by a filter circuit which transmits frequency components that are odd factors of the fundamental frequency of the signal. Consequently, noise components are adequately removed, thereby allowing the bit error rate to be reduced.

The object of the present invention is also achieved by means of a pager comprising: a quadrature detector which receives an intermediate frequency signal and performs quadrature detection; a first filter which is connected to said quadrature detector and passes low-frequency in the output of said quadrature detector; a comparator which is connected to said first filter and converts the output of said first filter to binary form using a prescribed threshold value; a second filter which is connected to said comparator and extracts a prescribed signal from the output of said comparator; a clock recovery circuit which is connected to said second filter and recoveries a clock by acquiring and tracking synchronization with respect to the output of the second filter; a sampler which is connected to said second filter and samples the output of the second filter on the basis of the clock output by said clock recovery circuit; and a second comparator which is connected to said sampler and converts the signal sampled by said sampler to binary form; wherein said second filter transmits frequency components which are odd factors of the fundamental frequency of the output signal of said comparator.

The object of the present invention is achieved by method for demodulating reception signals comprising the steps of: converting an intermediate frequency signal to a base band signal; converting said base band signal to binary form; transmitting frequency components which are odd factors of the fundamental frequency of the signal by filtering said binary signal; and decoding filtered signal in accordance with a clock recoveried from the basis of the filtered signal.

DESCRIPTION OF THE PREFERRED EMBODIMENTS

Figure 1:
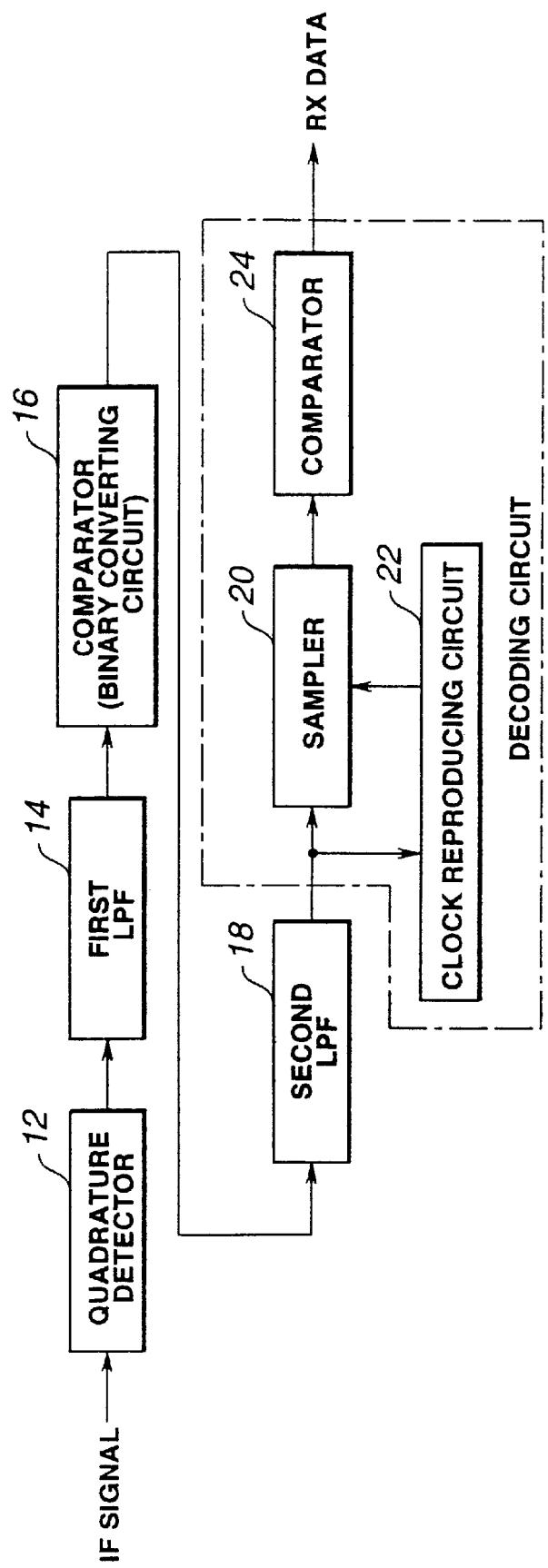
FIG. 1 is a block diagram showing the composition of the principal parts of a receiver relating to a mode for implementing the present invention.

Below, a mode for implementing the present invention is described with reference to the accompanying drawings. In this mode of implementation, the receiver is a pager which is capable of receiving signals on the basis of a FLEX (registered trademark) system. FIG. 1 is a block diagram showing the composition of the principal parts of a receiver relating to a mode for implementing the present invention. In this receiver, a signal received by a reception antenna (omitted from drawings) is converted to an intermediate frequency signal, IF Signal, at a front end (omitted from drawings). As shown in FIG. 1, this receiver 10 comprises, in addition to the reception antenna and front end: a quadrature detector 12 for receiving the intermediate frequency signal and performing quadrature detection; a first LPF 14 for filtering the detected signal; a comparator 16 for converting the filter signal to binary form; a second LPF 18 for transmitting prescribed frequency components of the binary-converted signal (digital signal); a sampler 20 for sampling the output of the second LPF 18 on the basis of a clock supplied by a clock recovery clock 22; a clock reproducing circuit 22 for outputting a required clock by acquiring and tracking synchronization on the basis of the output from the second LPF 18; and a comparator for converting the output signal sampled by the sampler 20 to binary form.

Figure 6:
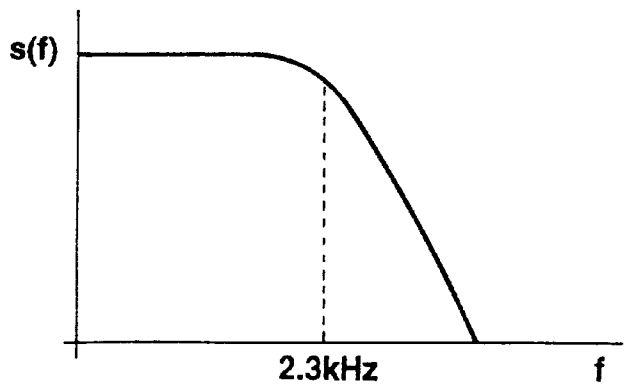
FIG. 6 is a diagram showing amplitude characteristics of a first LPF.

Conventional devices can be used for the quadrature detector 12, first LPF 14, comparator 16, sampler 20, clock reproducing circuit 22 and comparator 24. In other words, the first LPF 14 is an analogue filter designed such that it is compatible with a symbol rate of 3200 sps, and it has amplitude characteristics as shown in FIG. 6, for example.

The comparator 16 converts the signal filtered by the first LPF 14 to binary form using a prescribed threshold value.

In this mode of implementation, the signal having passed through the quadrature detector 12 and first LPF 14 is converted to binary form by the comparator 16. In other words, the output from the comparator 16 is an approximately square wave consisting of "1"s or "0"s. Therefore, the square wave f(t) can be expressed as the sum of the odd-numbered degrees of a sine wave (sint) of the fundamental frequency.

Figure 2:
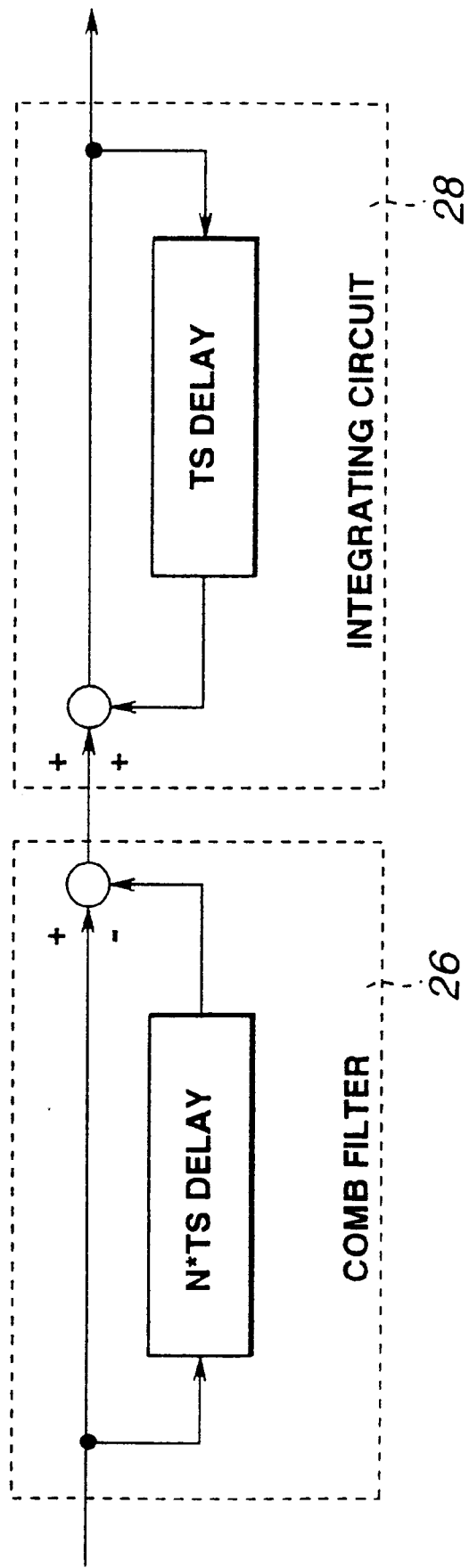
FIG. 2 is a functional block diagram showing the composition of a second LPF relating to a mode for implementing the present invention.

In this mode of implementation, a CIC (Cascaded Integrator Comb) filter is used for the second LPF 18. FIG. 2 is a functional block diagram showing the composition of a second LPF 18 relating to this mode of implementation. As shown in FIG. 2, the second LPF 18 comprises a comb filter 26 located in a first stage and an integrating circuit 28 located in a following stage. The comb filter 26 comprises delay means (N * Ts delay) for delaying a sampling period Ts by a prescribed number of steps N, and a subtracter for subtracting the output of this delay means from the input. Furthermore, the integrating circuit comprises delay means (Ts delay) for delaying and feeding back the output by one sample period Ts, and an adder for adding the output from this to the current output. In this mode of implementation, the comb filter 26 located at the first stage operates at step number N=16 and Ts=1/25.6 (msec) when the symbol rate is 1600 sps, and it operates at step number N=12 and Ts=1/38.6 (msec) when the symbol rate is 3200 sps. In other words, the comb filter 26 is composed such that the number of steps in the filter can be changed and the amplitude characteristics thereof can be changed in accordance with the symbol rate. Moreover, the integrating circuit 28 is provided in order to transmit direct current components.

Figure 3:
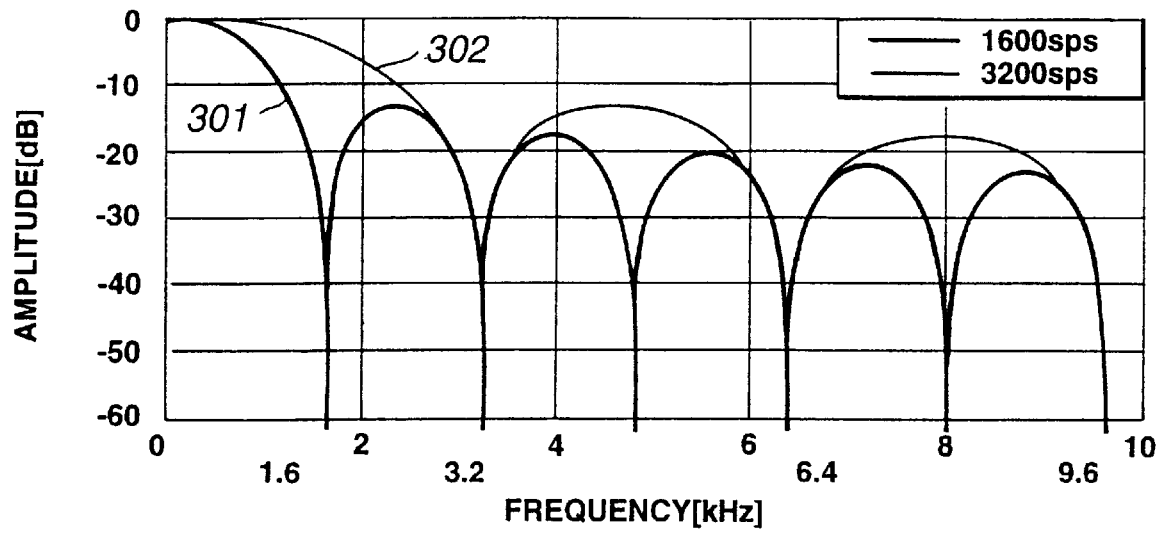
FIG. 3 is a diagram showing amplitude characteristics of a second LPF relating to a mode for implementing the present invention.

FIG. 3 is a diagram illustrating amplitude characteristics of a second LPF 18 relating to this mode of implementation. In this mode, the amplitude characteristics of the comb filter 26 can be changed according to the symbol rate, and therefore the amplitude characteristics of the second LPF 18 also change in accordance with the symbol rate. In FIG. 3, the curve 301 shown by the thick line represents amplitude characteristics when the symbol rate is 1600 sps, whilst the curve 302 shown by the thin line represents amplitude characteristics when the symbol rate is 3200 sps. As shown in FIG. 3, at a symbol rate of 1600 sps, frequency components which are odd factors of 800 Hz can be transmitted by the second LPF 18, and at a symbol rate of 3200 sps, frequency components which are odd factors of 1600 Hz can be transmitted by the second LPF 18. This corresponds to the fact that in this receiver, the signal components output from the comparator after quadrature detection are the sum of the odd-numbered degrees of the fundamental frequency. In a conventional moving average-type filter, the gain does not reach a low level at even-numbered degrees of the fundamental frequency (e.g., 1600 Hz in the case of 1600 sps symbol rate), as in a CIC filter, but rather a uniform gain is obtained, with gain reduction of approximately −20 dB in general. On the other hand, with a CIC filter, the gain becomes extremely small, so susceptibility to the effects of noise, etc. is reduced, thereby improving the BER, as described hereinafter. When a CIC filter is compared with a conventional moving average-type filter, a CIC filter is more effective with respect to double waves than a moving average-type filter.

If the symbol rate is 1600 sps, the fundamental frequency is 800 Hz, and if the symbol rate is 3200 sps, the fundamental frequency is 1600 Hz. Therefore, in the present mode of implementation, the amplitude characteristics can be varied in accordance with the symbol rate, as described above.

By passing the signal through the second LPF 18, a signal, wherein the necessary frequency components are transmitted suitably whilst noise components are eliminated, is supplied to the sampler 20 and clock reproducing circuit 22. In the clock reproducing circuit 22, a clock required for sampling by the sampler 20 is generated on the basis of the second LPF 18 and output to the sampler 20.

At the sampler 20, the output signal from the second LPF 18 is sampled in accordance with the clock supplied by the clock reproducing circuit 22, and the signal obtained is output to a comparator 24. At the comparator 24, the signal sampled in accordance with the aforementioned clock is converted to binary form, thereby creating data consisting of "1" and "0"s, which is output.

Figure 4:
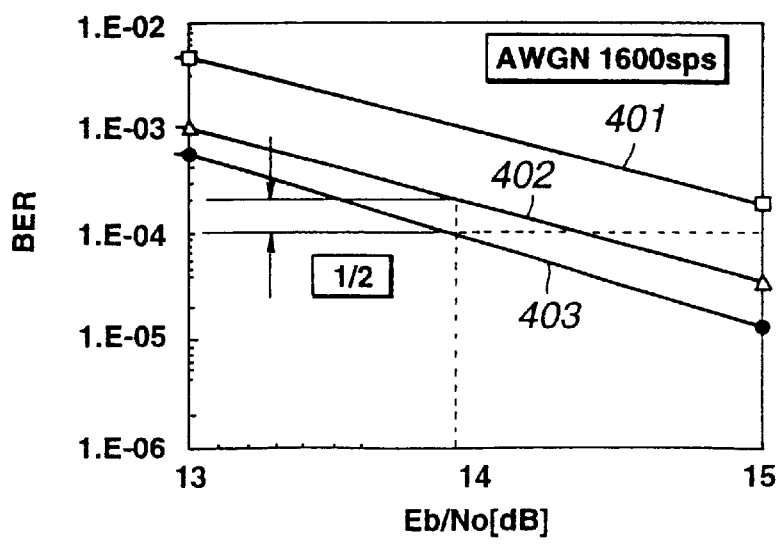
FIG. 4 is a diagram showing a simulation of a case where a second LPF relating to a mode for implementing the present invention is used.

Finally, the results of a simulation implemented according to the present mode of implementation is described. In this simulation, the bit error rate in the case of a symbol rate of 1600 sps was calculated in an AWGN (white Gaussian noise) environment and a fading environment. FIG. 4 shows the results of the simulation in an AWGN environment. In FIG. 4, the straight line 401 linking the square-shaped plots represents the bit error rate when no second LPF is provided, the straight line 402 linking the triangular-shaped plots represents the bit error rate in a case where a conventional moving average-type LPF is used, and the straight line 403 linking the black circular plots represents the bit error rate in a case where a CIC filter relating to the present mode of implementation is used as a second LPF.

As FIG. 4 shows, the bit error rate in the case where a second LPF according to the present mode of implementation is used is less than the bit error rate in a case where a conventional moving average-type LPF is used. For example, at BER=1×10$^{-4}$, the bit error rate (BER) is reduced by ½.

Figure 5:
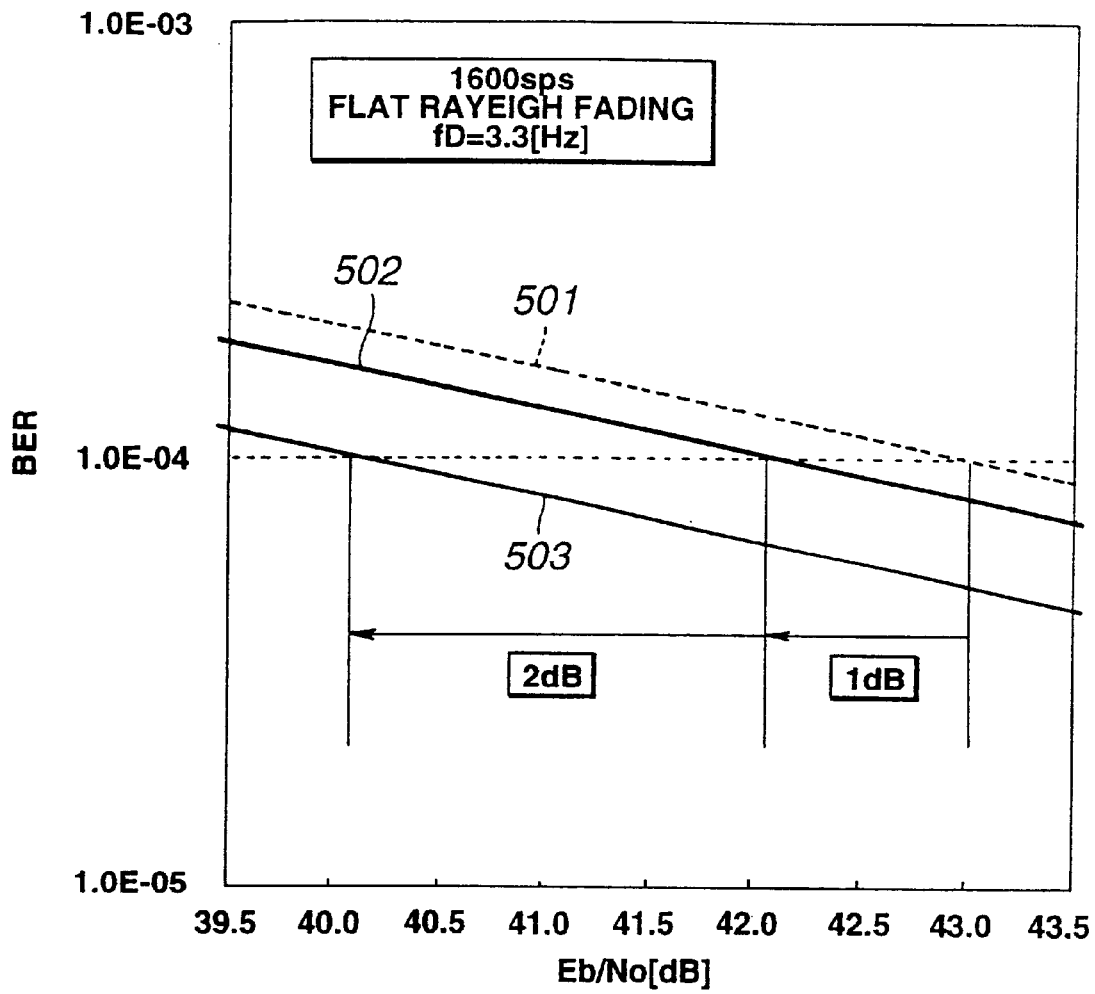
FIG. 5 is a diagram showing a simulation of a case where a second LPF relating to a mode for implementing the present invention is used.

Furthermore, FIG. 5 shows simulation results in a fading environment. In FIG. 5, the straight line 501 shown by the dotted line represents the bit error rate in a case where a conventional moving average-type LPF is used, and the straight line 502 shown by the solid line represents the bit error rate in a case where a CIC filter according to the present mode of implementation is used as a second LPF. Furthermore, the straight line 503 shown by the thin solid line represents theoretical values.

As FIG. 5 reveals, the characteristics in a case where a second LPF according to the present mode of implementation is used, although approximately 2 dB inferior to theoretical values, are approximately 1 dB superior to a conventional filter, when compared at the same BER. In this way, it can be seen that if a second LPF according to the present mode of implementation is used, it is particularly suitable for use in a fading environment.

Moreover, although a conventional moving average-type filter can be composed by 21 shift register stages, in the present mode of implementation, a second LPF can be constituted by 16 shift register stages. With this point in mind, when circuit size was compared using logic synthesizing tools, it was found that the circuit size can be reduced by approximately 30% compared to a conventional moving average-type filter.

According to the present mode of implementation, a composition is adopted whereby a signal converted to binary form by a comparator after quadrature detection passes through a second filter which transmits only frequency components which are odd degrees of a fundamental frequency, thereby making it possible to improve bit error rate and reduce circuit size.

Naturally, the present invention is not limited to the foregoing mode of implementation, and various modifications thereof are possible and these are also contained within the scope of the present invention.

For example, in the foregoing mode of implementation, a CIC filter comprising a comb filter and an integrating circuit was used as a second filter, but the present invention is not limited to this and any composition which allows odd-numbered degrees of the fundamental frequency to be transmitted may be used.

Furthermore, in the foregoing mode of implementation, a receiver based on a FLEX (registered trademark) system where the transmission speed and modulation method were variable, which stipulates two symbol rates, was used. In this way, the present invention is suitable for a receiver based on a system which stipulates a plurality of symbol rates, but it is not limited to this and the present invention may also be applied to systems where there is a single symbol rate. Furthermore, the transmission speed and modulation method are not required to be variable.

Moreover, in the present mode of implementation, the present invention was applied to a pager, but it is not limited to this and, naturally, may also be applied to other receivers, such as portable telephones, etc.

Furthermore, in the present specification, reference to 'means' does not necessarily indicate physical means, but also includes cases where the functions of each 'means' are realized by software. Moreover, the function of one means may be realized by two or more physical means, or the functions or two or more means may be realized by a single physical means.

As described above, according to the present invention, since a signal converted to binary form by a binary converting circuit such that it has an approximately square waveform is filtered by a filter circuit which transmits frequency components which are odd factors of the fundamental frequency of the signal, noise components are adequately eliminated, thereby making it possible to improve the bit error rate.

Furthermore, according to the present invention, since the aforementioned filter circuit is constituted by a CIC (Cascaded Integrator Comb) filter, it is possible to reduce circuit size compared to conventional moving average-type filters, thereby enabling power consumption to be lowered.

Furthermore, according to the present invention, since the aforementioned receiver receives signals at a plurality of symbol rates, and said filter circuit is composed such that the transmitted frequency components which are odd factors of the fundamental frequency are changed in accordance with changes in said symbol rate, it is possible to eliminate noise adequately, even in cases where a reception method comprising a plurality of symbol rates, such as a FLEX (registered trademark) system, is used, thereby enabling bit error rate to be reduced.

What is claimed is:

1. A receiver comprising:

a detector circuit which receives an intermediate frequency signal and converts it to a base band signal;

a binary converting circuit which is connected to said detector circuit and converts said base band signal to binary form;

a filter circuit which receives output signal from said binary converting circuit and transmits frequency components of said output signal which are odd factors of the fundamental frequency of said output signal; and a decoding circuit which is connected to said filter circuit and decodes output signal in accordance with a clock generated on the basis of the output signal from said filter circuit.

wherein said filter circuit comprises delay means which receives output signal from said binary converting circuit as input signal and delays said input signal by an integral number N times a sampling period Ts, and a subtracter which is connected to said delay means and subtracts the output of said delay means from said input signal.

2. The receiver according to claim 1, wherein said filter circuit further comprises an adder which receives output signal from said subtracter and adds the output signal to other signal, and second delay means which receives output signal from said adder and delays the output signal by one sample period, feeding back said output to said adder as the other signal.

3. The receiver according to claim 1, wherein said delay means operates at N=16, Ts=1/25.6 (msec), when the symbol rate of the input signal is 1600 sps, and it operates at N=12, Ts=1/38.4 (msec) when the symbol rate is 3200 sps.

4. The receiver according to claim 1, wherein said filter circuit includes a CIC (Cascaded Integrator Comb) filter.

5. A receiver comprising:

a detector circuit which receives an intermediate frequency signal and converts it to a base band signal;

a binary converting circuit which is connected to said detector circuit and converts said base band signal to binary form;

a filter circuit which receives output signal from said binary converting circuit and transmits frequency components of said output signal, which are odd factors of the fundamental frequency of said output signal; and a decoding circuit which is connected to said filter circuit and decodes output signal in accordance with a clock generated on the basis of the output signal from said filter circuit;

wherein said receiver receives a plurality of signals of different symbol rates, and said filter circuit changes the transmitted frequency components which are odd factors of the fundamental frequency in accordance with changes in said symbol rate.

6. A pager comprising:

a quadrature detector which receives an intermediate frequency signal and performs quadrature detection;

a first filter which is connected to said quadrature detector and extracts low-frequency components from the output of said quadrature detector;

a comparator which is connected to said first filter and converts the output of said first filter to binary form using a prescribed threshold value;

a second filter which is connected to said comparator and extracts a prescribed signal from the output of said comparator;

a clock reproducing circuit which is connected to said second filter and generates a clock by acquiring and tracking synchronization with respect to the output of the second filter;

a sampler which is connected to said second filter and samples the output of the second filter on the basis of the clock output by said clock reproducing circuit; and a second comparator which is connected to said sampler and converts the signal sampled by said sampler to binary form;

wherein said second filter transmits frequency components which are odd factors of the fundamental frequency of the output signal of said comparator.

7. The pager according to claim 6, wherein said fundamental frequency is one of 1600 bps, 3200 bps and 6400 bps.

8. The pager according to claim 6, wherein said second filter includes a CIC (Cascaded Integrator Comb) filter.

9. A method for demodulating reception signals comprising the steps of:

converting an intermediate frequency signal to a base band signal;

converting said base band signal to binary form;

transmitting frequency components which are odd factors of the fundamental frequency of the signal by filtering said binary signal; and decoding filtered signal in accordance with a clock reproduced on the basis of the filtered signal, wherein said filtering step comprises a delay step for delaying an input signal by an integral number N times a sample period Ts, and a subtracting step for subtracting the delayed signal from said input signal.

10. The method for demodulating reception signals according to claim 9, wherein said filtering step further comprises a second delay step for delaying the subtracted signal by one sample period and feeding back said signal, and an adding step for adding the signal delayed by said second delay step to the subtracted signal.

11. The method for demodulating reception signals according to claim 9, wherein the delay operation is implemented at N=16, Ts=1/25.6 (msec), when the symbol rate of the input signal is 1600 sps, and at N=12, Ts=1/38.4 (msec) when the symbol rate is 3200 sps.

12. A method for demodulating reception signals comprising the steps of:

converting an intermediate frequency signal to a base band signal;

converting said base band signal to binary form;

transmitting frequency components which are odd factors of the fundamental frequency of the signal by filtering said binary signal; and decoding filtered signal in accordance with a clock reproduced on the basis of the filtered signal;

wherein the frequency components, which are odd factors of the fundamental frequency, transmitted by said filtering step are changed in accordance with changes of the symbol rate, when a plurality of signals of different symbol rate are received.

13. A receiver comprising:

a detector circuit which receives an intermediate frequency signal and converts it to a base band signal;

a binary converting circuit which is connected to said detector circuit and converts said base band signal to binary form;

a filter circuit which receives an output signal from said binary converting circuit and transmits frequency components of said output signal, which are odd factors of the fundamental frequency of said output signal; and a decoding circuit which is connected to said filter circuit and decodes the output signal in accordance with a clock generated on the basis of the output signal from said filter circuit, wherein said filter circuit comprises delay means which receives the output signal from said binary converting circuit as an input signal and delays said input signal by an integral number N times a sampling period Ts, and a subtracter which is connected to said delay means and subtracts the output of said delay means from said input signal.

14. The receiver according to claim 13, wherein said filter circuit further comprises an adder which receives an output signal from said subtracter and adds the output signal to another signal, and second delay means which receives an output signal from said adder and delays the output signal by one sample period, feeding back said output to said adder as the other signal.

15. The receiver according to claim 13, wherein said delay means operates at N=16, Ts=1/25.6 (msec), when the symbol rate of the input signal is 1600 sps, and it operates at N=12, Ts=1/38.4 (msec) when the symbol rate is 3200 sps.

16. A method for demodulating reception signals comprising the steps of:

converting an intermediate frequency signal to a base band signal;

converting said base band signal to binary form;

transmitting frequency components which are odd factors of the fundamental frequency of the signal by filtering said binary signal; and decoding the filtered binary signal in accordance with a clock reproduced on the basis of the filtered signal, wherein said filtering step comprises a delay step for delaying an input signal by an integral number N times a sample period Ts, and a subtracting step for subtracting the delayed signal from said input signal.

17. The method for demodulating reception signals according to claim 16, wherein said filtering step further comprises a second delay step for delaying the subtracted signal by one sample period and feeding back said signal, and an adding step for adding the signal delayed by said second delay step to the subtracted signal.

18. The method for demodulating reception signals according to claim 16, wherein the delay operation is implemented at N=16, Ts=1/25.6 (msec), when the symbol rate of ht input signal if 1600 sps, and at N=12, Ts=1/38.4 (msec) when the symbol rate is 3200 sps.

* * * * *